Dec. 27, 1960   W. KELLERMAN   2,966,050
FLUID PRESSURE OPERATED TIMING AND CONTROL DEVICES
Filed Dec. 8, 1954   4 Sheets-Sheet 1

Inventor
William Kellerman
by Morsell & Morsell
ATTORNEYS.

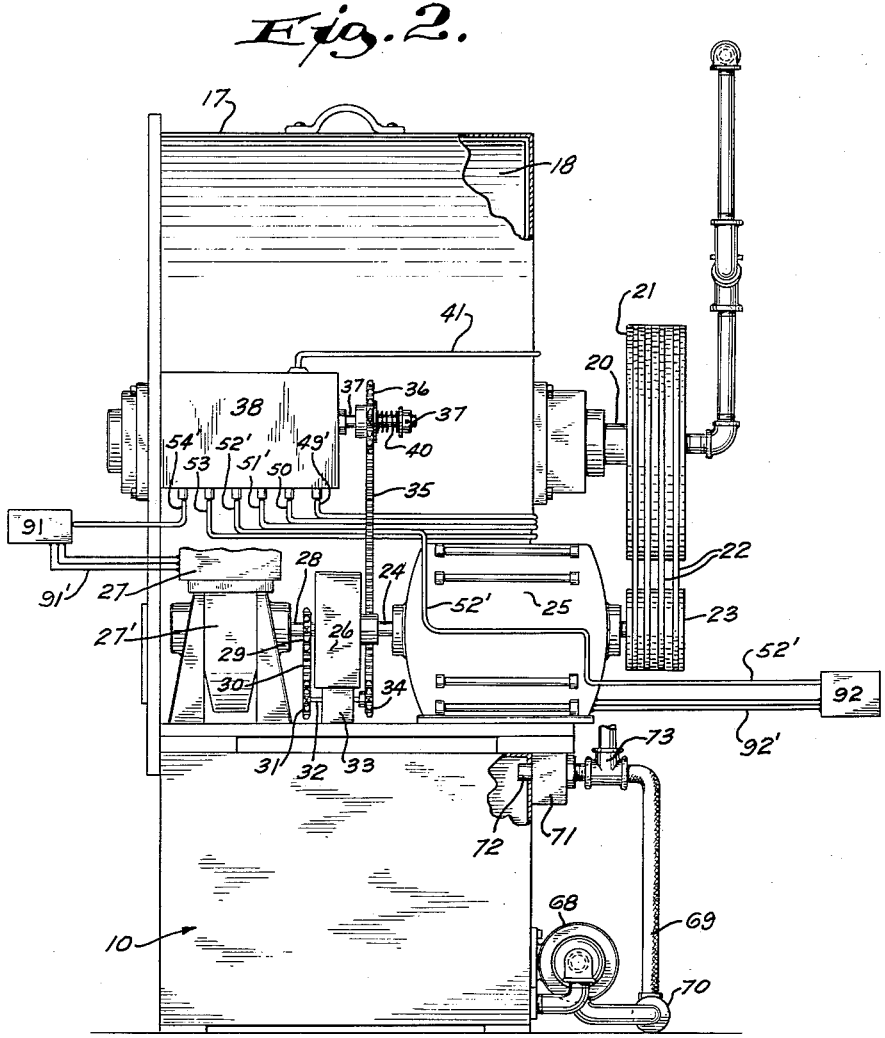
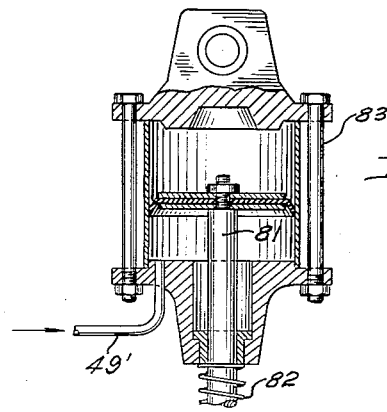

Dec. 27, 1960  W. KELLERMAN  2,966,050
FLUID PRESSURE OPERATED TIMING AND CONTROL DEVICES
Filed Dec. 8, 1954  4 Sheets-Sheet 3
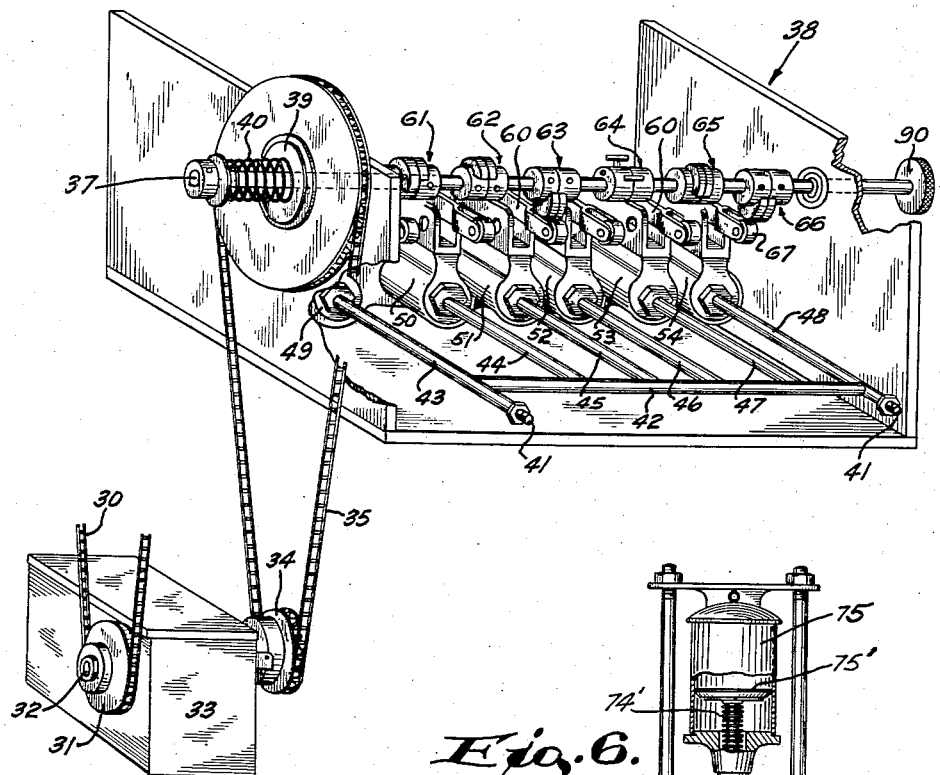
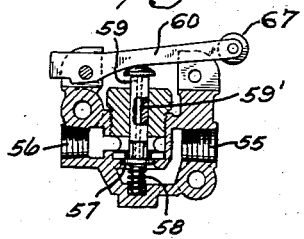
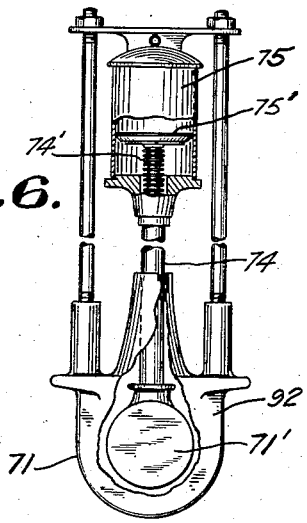
INVENTOR.
William Kellerman
BY
Morsell & Morsell
ATTORNEYS.

Dec. 27, 1960 W. KELLERMAN 2,966,050
FLUID PRESSURE OPERATED TIMING AND CONTROL DEVICES
Filed Dec. 8, 1954 4 Sheets-Sheet 4

INVENTOR.
William Kellerman
BY
Morsell & Morsell
ATTORNEYS.

United States Patent Office 2,966,050
Patented Dec. 27, 1960

2,966,050

FLUID PRESSURE OPERATED TIMING AND CONTROL DEVICES

William Kellerman, Chicago, Ill., assignor to Kling "100" Corporation, Franklin Park, Ill., a corporation of Illinois Filed Dec. 8, 1954, Ser. No. 473,997

3 Claims. (Cl. 68—12)

This invention relates to improvements in fluid pressure operated timing and control devices.

In the use of certain types of automatic machines, such as automatic dry cleaning machines, it is necessary to have automatic controls which will start and stop the various operations after the lapse of a predetermined interval of time as the machine is going through its cycle.

In a dry cleaning machine there are numerous valves which must be opened and closed during the cycle, and it has heretofore been customary to actuate these valves by electric switches. In a dry cleaning machine, however, highly volatile cleaning fluid is usually employed, and the sparking of electric switches creates a hazard. As a result, very expensive non-sparking switches have been used to try to reduce the hazard.

It is a general object of the present invention to provide a timing and control device, suitable for use in connection with automatic dry cleaning machines, wherein the timing device is operable by fluid pressure, preferably pneumatically, and wherein there is fluid pressure operation of valves to eliminate the hazard which is attendant upon the use of electric switches.

A further object of the invention is to provide an improved dry cleaning machine having a fluid pressure operated control and timing device.

A further object of the invention is to provide a dry cleaning machine wherein there is a shaft driven by one electric motor for rotating the drum at relatively slow washing speed, and wherein there is another electric motor for operating the drum at relatively high extracting speed, there being an overrunning clutch between said shaft and second motor, and there also being a timing shaft driven by said first shaft through a speed reduction unit so as to control the various operations.

A further object of the invention is to provide a timing and control device including a timing shaft having novel cam assemblies thereon which are arranged and constructed to provide for ready adjustment of the time when the cam member takes effect and of the length of engagement.

With the above and other objects in view, the invention consists of the improved fluid pressure operated timing and control device, and all of its parts and combinations, as set forth in the claims, and all equivalents thereof.

In the accompanying drawings, illustrating one complete embodiment of the preferred form of the invention, wherein a pneumatic timing and control device is shown as used in conjunction with a dry cleaning machine:

Fig. 2 is a side elevational view looking at the left hand side of the apparatus of Fig. 1;

Fig. 3 is a fragmentary detail view in perspective showing the timing portion of the apparatus, part of the casing being removed and part broken away;

Fig. 4 is a fragmentary view, principally in vertical section, of the upper portion of one of the dump valves;

Fig. 5 is a vertical longitudinal sectional view through one of the fluid valves of the timer;

Fig. 6 is a view, principally in vertical section, through one of the by-pass valves of the dry cleaning machine;

Figure 1:
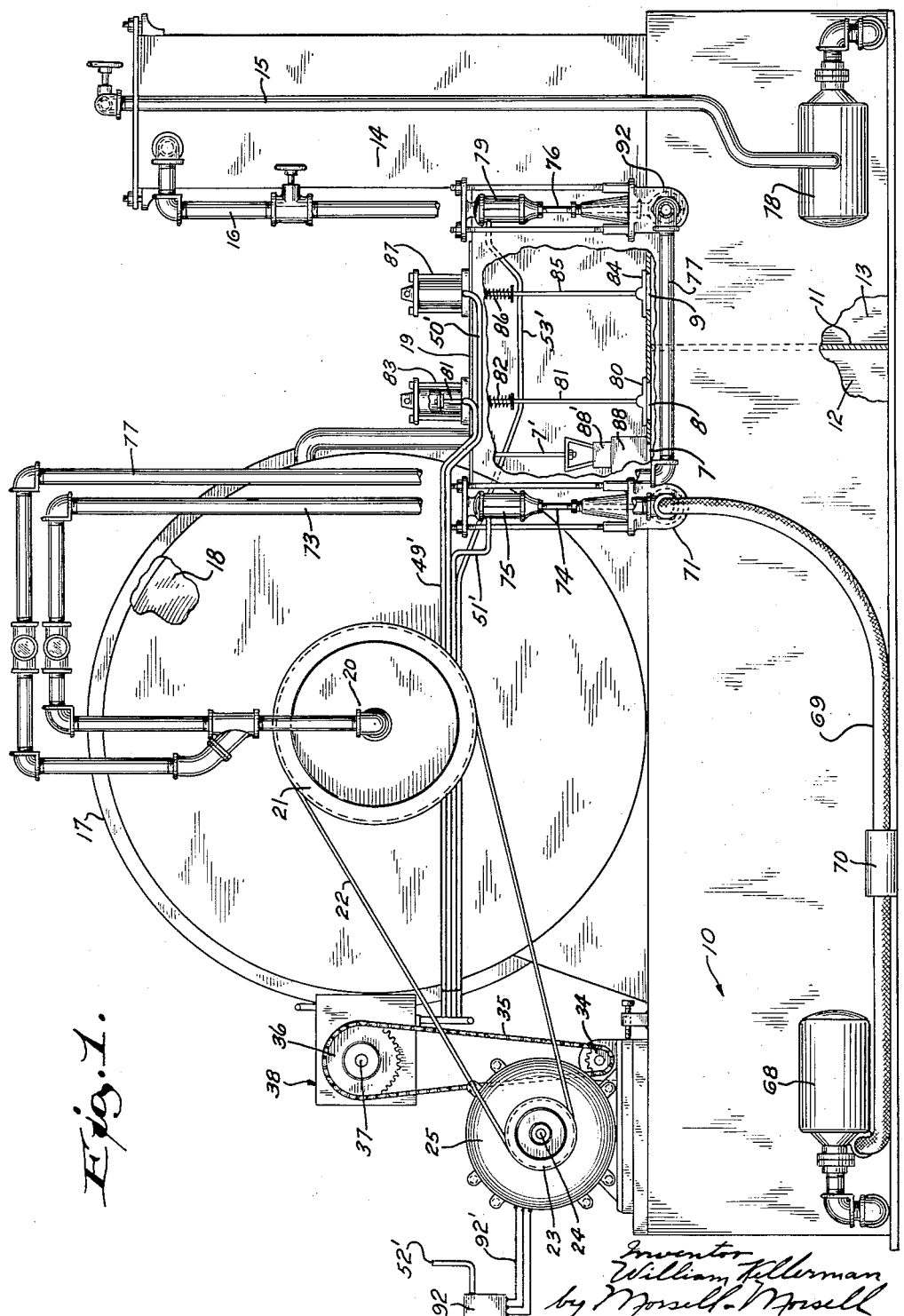
Fig. 1 is a front elevational view of a dry cleaning machine, parts being broken away.

Referring more particularly to the drawings the numeral 10 designates a reservoir having a partition 11 therein to divide it into two separate compartments. The compartment 12 is adapted to contain soapy naphtha cleaning solution and the compartment 13 is adapted to contain clear naphtha for rinsing purposes. Superimposed on one end of the reservoir over the compartment 13 is a filter 14 having inlet pipe line 15 and outlet line 16 associated therewith.

Superimposed over the main compartment 12 is a casing 17 within which the drum 18 of a dry cleaning machine is rotatably mounted. The casing 17 has a lateral box-like extension 19, the interior of which forms a liquid outlet chamber, with part of the extension being positioned over the soapy naphtha compartment 12 of the reservoir, and with part of the extension being positioned over the clear liquid compartment 13 of the reservoir. There is a dumping opening 8 in the top of the tank compartment 12 which communicates with the interior of the extension 19, and there is a similar opening 9 in the top of the tank compartment 13.

The drum 18 is mounted on a shaft 20 and the latter projects from the casing as illustrated in Fig. 2 and carries a sheave 21 which is connected by multiple V-belts 22 with a smaller sheave 23 mounted on the driven shaft 24 of an electric motor 25. The end of the shaft 24 which projects from that end of the motor 25 which is opposite to the sheave 23 is connected through an over-running clutch 26, with a shaft 28 driven by an electric motor 27 through reduction gearing in a box 27'. A sprocket wheel 29, on the portion of the shaft 28 which is at the left of the over-running clutch 26, is connected by an endless chain 30 with a sprocket wheel 31 mounted on the shaft 32 of a gear reduction unit 33. Power from the electric motor 27 is transmitted through the gear reduction unit 33 to sprocket wheel 34 at greatly reduced speed (preferably 900 to 1), and the sprocket 34 is connected by an endless chain 35 with a sprocket 36 on the shaft 37 of the timing unit 38 (see Fig. 3), the shaft 37 being driven through a pressure plate clutch unit 39 including a spring 40. As a result of this arrangement the timing shaft 37 is driven at very slow speed.

Inlet pipes 41 extending from a suitable source of fluid under pressure, such as air under pressure, lead to a manifold 42 (see Fig. 3), there being branch pipes 43, 44, 45, 46, 47 and 48 of the manifold which connect with fluid valves 49 to 54 respectively, as shown in Fig. 3. Each of these valves is of the general type shown in Fig. 5 and each valve includes an inlet port 55 to which one of the lines 43 to 48 is connected, and an outlet port 56. This valve may be of any standard type such as the 3-way air valve made by Schrader Valve Co., and includes a valve member 57 normally closed by a spring 58, there being a slidable plunger 59 actuated by a pivoted rocker arm 60 for opening the valve 57 against the tension of the spring 58 when the rocker arm is actuated to depress the plunger 59. The valve of Fig. 5 contains any conventional type of relief mechanism to relieve the air pressure on the outlet side of the valve after the valve 57 and plunger 59 have been returned to valve closing position by the spring 58. This relief may take place through a port 59' in the plunger 59, which port communicates at one end with the outlet side of the valve and at its other end with the atmosphere.

The shaft 37 of the timing device has rigidly and adjustably mounted thereon cam assemblies 61, 62, 63, 64, 65 and 66 which are adapted to engage rollers 67 of the rocker arms 60 to actuate the valves 49 to 54 respectively. Each cam is adjusted to open its valve at a predetermined time, and its effective shape is variable, as will be hereinafter described and as shown in Figs. 7–10, to change the effective length of the high surface of the cam so as to maintain its valve member in open position for a predetermined time interval as required in the cycle of operation.

Figure 7:
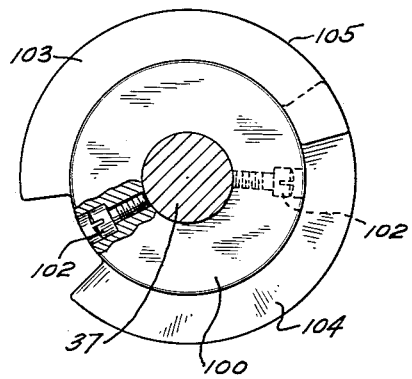
Fig. 7 is a transverse sectional view through the timing shaft showing one of the adjustable cam assemblies.
Figure 8:
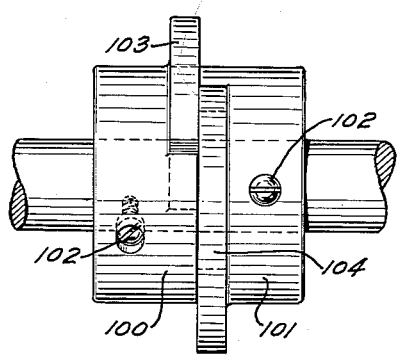
Fig. 8 is a fragmentary view looking at the periphery of the cam assembly of Fig. 7.

Referring to Figs. 7 and 8, each of the cam assemblies 61, 62, 63, 65 and 66 of Fig. 3 includes a pair of collars 100 and 101. The collar 100 is adjustably fixed to the shaft 37 by a set screw 102, and the collar 101 by a like set screw 102. The collar 100 has an arcuate cam projection 103 projecting from its periphery near one face and the collar 101 has another arcuate cam projection 104 projecting from the face which is near the cam 103 of the element 100. Figs. 7 and 8 show a cam assembly having one of the longer cam surfaces. It will be noted that each of the cam projections 103 and 104 extends about 180°. By manipulation of the set screws 102, the cam projections 103 and 104 may be adjusted relative to one another to obtain a large variance in the effective length for the periphery 105 of the combined cam surfaces. All of the cam assemblies 61, 62, 63, 65 and 66 are in pairs the same way and the elements of each pair are relatively adjustable to vary the effective length of the cam surface corresponding to the surface 105 of Fig. 7. A number of the other cam assemblies, however, use much shorter arcuate projections than the projections 103 and 104, that is, projections whose peripheries extend for a lesser number of degrees.

Figure 9:
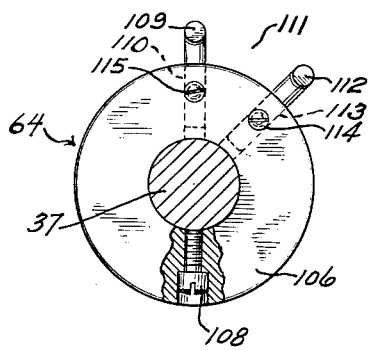
Fig. 9 is a transverse sectional view through the timing shaft showing another type of cam assembly which is used in the present invention.
Figure 10:
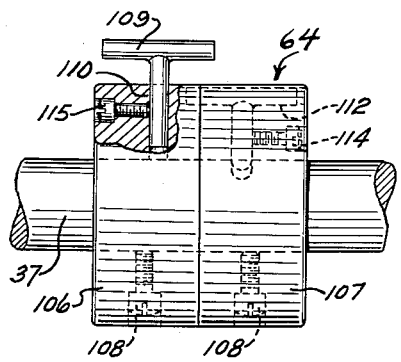
Fig. 10 is a view looking at the periphery of the cam assembly of Fig. 9.

The cam assembly 64 is of a different type and is shown in Figs. 9 and 10. This cam comprises a pair of collars 106 and 107 which are secured by set screws 108. Instead of having the arcuate projections, however, one cam member has the stem of a T 109 slidably inserted in an opening 110 and held adjustably in position by a set screw 115. The other member has the stem of another T 112 slidably inserted in a hole 113 and held adjustably in position by a set screw 114. For the cam assembly 64 the cross bars of the T's 109 and 112 have been set about 45 degrees apart as shown in Fig. 9 before tightening the set screws 108. The length of time that a rocker arm is held down by the cross bar of one of the T's may be varied by varying the distance that the cross bar of the T projects beyond the periphery of its collar. With this arrangement the rocker arm for the valve 52 will be held down for a predetermined length of time by the bar 112 and then will be released for a period during which the roller of the rocker arm will be between the cross bars of the T's 109 and 112 in the space 111 of Fig. 9. Thereafter the roller of the rocker arm will be engaged by the cross bar of the T 109 and again depressed.

The outlets 56 of the valves 49 to 54 inclusive, are connected by fluid lines 49' to 54' inclusive, respectively, with the devices which are to be actuated by the air pressure as will hereinafter be explained.

A suitably driven pump 68 is adapted to pump soapy naphtha from the compartment 12 of the reservoir 10 through a line 69 having a filter 70 therein. The line 69 leads into a two-way valve 71, preferably a gate valve, which directs the flow of fluid either back into the compartment 12 of the reservoir as at 72 (see Fig. 2), or into a pipe 73. The connecting portion of pipe 73 is broken away in Fig. 1 for the purposes of clarity. The operation of the valve 71 is controlled by a fluid pressure operated ram 74 connected with the gate member 71' which projects slidably from a fluid cylinder 75. Fluid such as air under pressure is directed into the cylinder by the pipe line 51' leading from the timing device 38. The ram portion 75' is normally maintained in raised position by a spring 74' (shown compressed in Fig. 6). When in raised position, fluid pumped through the line 69 is continually by-passed back into the compartment 12 of the reservoir through the opening 72. When, however, there is air pressure in the line 51', then the ram 74 is depressed to shut off the flow through 72 back into the tank, and to permit the flow into the pipe 73 leading into the center of the dry cleaning machine as shown in Fig. 1.

A ram 76 of another control valve, which, however, is the same structure as the valve of Fig. 6, controls the flow of liquid through the line 77 which carries clear liquid into the dry cleaning machine. Normally, the ram 76 is maintained in raised position by a spring, like the spring 74' of Fig. 6, to allow recirculation of clear naphtha, which is pumped by the pump 78 from the compartment through line 15 and filter 14, back into the compartment 13, through line 16. When, however, there is air pressure in the line 53' leading to the cylinder 79 for the ram 76, this will operate the valve to shut off the flow back to the tank compartment 13 and will permit the flow of clear naphtha through the pipe line 77 into the dry cleaning machine.

The valve 80, which controls the flow of liquid from the interior of the extension housing 19 back into the compartment 12 of the tank, has a plunger 81 projecting upwardly therefrom. A spring 82 normally maintains the valve 80 in a position to shut off communication through hole 8 between the interior of the extension 19 and the compartment 12. However, when there is air pressure in the line 49' which leads to an air cylinder 83, the valve 80 will be opened to dump liquid (soapy naphtha) back into the compartment 12 through the opening 8.

Another valve 84 in the extension 19, controls communication through the hole 9 between the chamber within the extension 19 and the compartment 13 of the reservoir 10. There is a plunger 85 projecting upwardly from the valve 84 which is normally urged by a spring 86 into valve closing position. When there is air pressure in the line 50' which leads to an air cylinder 87, the valve 84 will be opened to allow rinsing liquid to be dumped back into the compartment 13 of the reservoir 10 through the opening 9. This mechanism is the same as that used in conjunction with valve 80 and shown in detail in Fig. 4.

Also in the extension housing 19, and communicating with an opening 7 in its bottom, is an overflow tube 88 having a telescopic open-topped extension 88' which is manually movable in a vertical direction from the exterior through a rod 7' to vary the effective height of the open top of the extension 88' and hence adjust the level which will be maintained in extension 19 as well as in the dry cleaning machine, as the liquid will seek the same level therein as in the extension 19.

*Operation*

In operation of a dry cleaning machine equipped with the improved timing and control device, it is first necessary to rotate the shaft 37 of the timer manually through a knob 90 (see Fig. 3) until the high part of cam 66 engages the roller 67 of the valve 54 to open the valve 54. This will let air under pressure from the line 48 pass through the valve and out of the line 54', which line leads to an air pressure operated electric switch 91 preferably located in another room and connected by wires 91' to the motor 27 to start the motor (see Fig. 2). The motor 27, through the gear reduction in box 27', will rotate the shaft 28 at a reduced speed, and the shaft 28 will turn the shaft 24 of the idle motor 25 rotating the sheave 23 (see Fig. 2). Through the belts 22 and sheave 21, the drum 18 will be driven at washing speed.

At the same time that the high part of the cam 66 opens the valve 54, the cam 63 will actuate the rocker arm 60 for the valve 51 to allow air under pressure from the line 45 to pass through the valve and into the line 51'. This line 51' leads to the cylinder 75 (Fig. 1) to actuate the ram 74 and shut off the by-pass leading to the compartment 12 of the tank 10. With the pump 68 in operation, soapy naphtha from the compartment 12 of the tank 10 will then be pumped through the line 69 into the line 73 and into the center of the drum through hollow shaft 20, to fill the dry cleaning machine with washing liquid. Due to the very slow rotation of the shaft 37 of the timer, because of the 900 to 1 reduction in the reduction unit 33, and due to the effective adjusted length of the cam, the extensions of cam assembly 63 and the rocker arm 60 for the valve 51 will be held down for 15 minutes before the high part of the cam 63 releases the rocker arm to let the valve 51 close. This is usually proper time to completely fill the machine to a proper level. However, should the machine be filled before the 15 minutes is up, any surplus liquid will flow out of the overflow sleeve 88' and hole 7 in the extension 19.

At the end of this 15 minute period the cam 63 leaves the rocker arm, and the valve 51 closes. Inasmuch as there is no longer any air pressure acting in the line 51', as the air will bleed out of the port 59' in stem 59 (see Fig. 5), the spring actuated plunger 74 will act to open the valve 71 and let the soapy naphtha from the line 69 by-pass back into the tank through 72 (see Fig. 2). At this same moment that the by-pass valve 71 opens, the cam 61 acts on its rocker arm 60 to open the valve 49 of Fig. 3 and allow air under pressure to flow through the line 49' leading to the cylinder 83 for the valve 80 in the extension 19 (Fig. 1). This will cause opening of the valve 80 to allow the washing fluid in the dry cleaning machine to dump back into the compartment 12 of the tank 10.

Next, the cam 64 opens the valve 52 to allow air under pressure to enter the line 52'. This line leads to a pressure operated electric switch 92, preferably located in another room and connected to the motor 25 by wires 92'. This starts the extractor motor 25. This motor operates at high speed, but while operating, the overrunning clutch unit 26 permits the motor 27 to continue to rotate the shaft 28 at the substantially slower speed. This extracting operation continues for two to four minutes as governed by the effective adjusted length of the first cam-T's 109 or 112 to engage the rocker arm (Fig. 9). After two to four minutes the rocker arm roller falls into the space 111 (Fig. 9) between the cam-T's 109 and 112 to temporarily stop motor 25. Thereafter, the cam 61 leaves the rocker arm for the valve 49. When this occurs there is no longer any air pressure in the line 49' leading to the cylinders 83, and the spring 82 will close the valve 80.

At the same time the cam 62 will start to engage the rocker arm 60 for the valve 50. This will allow air under pressure to enter the line 50' to actuate the plunger 85 and open the dump valve 84 which allows rinsing liquid to be returned from the interior of the casing 19 back into the compartment 13 of the tank 10. Also, at the same time, the cam 65 acts to open the valve 53. This causes closing of the normally open valve 92 which is actuated by the plunger 76 (see Fig. 1). This prevents recirculation of clear fluid from the compartment 13 by the pump 78, and instead causes said clear fluid to flow through the pipe 77 and into the center of the washing machine. Due to the effective adjusted length of the extensions of cam assembly 65, after two to four minutes the cam 65 will release its rocker arm and close the valve 53 to allow the by-pass valve 92 to again open, due to spring action on the plunger 76, so that clear fluid is again by-passed from the pump 78 into the compartment 13 of the tank. The second cam-T of cam assembly 64 will then engage its rocker arm to again operate motor 25 so that the extracting operation continues for four more minutes with the valve 84 open, and this completes the cycle.

From the above it is clear that all of the timing and control is carried out by the slowly rotating cam shaft 37. Inasmuch as all of the cams are adjustably mounted, they can be set as desired through the screws 102 or 108 (see Figs. 8 and 10) to initiate an operation at a particular time with respect to the other operations, and the period of engagement is controlled by the effective adjusted length of the cam surface 105 (see Fig. 7) or by the adjusted height of the T's 109 and 112 of Fig. 9. With this invention the valves 71, 80, 84 and 92 are all fluid pressure operated and it is unnecessary to have dangerous electric switches near highly volatile fluid.

While the improved timing and control device is particularly suitable for use in connection with dry cleaning machines, it is obvious that it may be used for other purposes and such other adaptations are contemplated as may come within the scope of the claims.

Various changes and modifications may be made without departing from the spirit of the invention and all of such changes are contemplated as may come within the scope of the claims.

What I claim is:

1. In combination with a machine adapted to contain a volatile fluid having a rotatable member and having a plurality of fluid pressure operated valves for controlling the flow of fluid to and from the machine, an electric motor, means between said motor and the rotatable member for driving the latter, a timing and control device on said machine including a plurality of fluid valve assemblies each having a movable valve member, means for conducting fluid under pressure to said valve assemblies, a fluid line connecting each of said valves of the machine with one of said valve assemblies of the timing and control device, a fluid pressure operated electric switch for said motor located remotely from the volatile fluid-containing machine, a relatively long fluid line connecting said motor switch with one of the fluid valve assemblies of the timing and control device on the machine, a cam shaft rotatably mounted adjacent said valve assemblies, a cam for each valve assembly on said cam shaft and rotatable therewith, means between each cam and the movable valve member of a valve assembly for actuating the latter, each cam being positioned on the cam shaft to open its valve member at a particular time with respect to the operation of the other valve members and each cam being shaped to maintain its valve member in open position for a predetermined time interval, a speed reduction unit driven by the motor of said machine, transmission means connecting said speed reduction unit with said cam shaft to drive the latter at slow speed and manually operable means in addition to said transmission means for rotating said cam shaft whereby operation of the motor and machine may be initiated by manually rotating said cam shaft.

2. In combination with a machine adapted to contain a volatile fluid having a rotatable member and having a plurality of fluid pressure operated valves for controlling the flow of fluid to and from the machine, a first electric motor, a first shaft, means including a speed reducer between said first motor and first shaft for driving said shaft at slow speed, a second electric motor having a driven shaft, over-running clutch mechanism between said first shaft and the shaft of the second motor whereby said shaft of the second motor may be driven at slow speed by the first motor when the second motor is idle, transmission means between the shaft of said second motor and the rotatable member of the machine for operating the latter, a timing and control device on the machine and including a plurality of fluid valve assemblies each having a movable valve member, a fluid line connecting each valve of the machine with one of said valve assemblies, a fluid pressure operated electric switch for said first motor located remotely from the volatile fluid-containing machine, a fluid pressure operated electric switch for said second motor located remotely from the volatile fluid-containing machine, a relatively long fluid line connecting the switch of the first motor with one of said valve assemblies, a relatively long fluid line connecting the switch of the second motor with another of said fluid valve assemblies, a manually rotatable cam shaft rotatably mounted adjacent said valve assemblies, a cam for each valve assembly on said cam shaft and rotatable therewith, means between each cam and the movable valve member of a valve assembly for actuating the latter, each cam being positioned on the cam shaft to open its valve member at a particular time with respect to the operation of the other valve members, and each cam being shaped to maintain its valve member in open position for a predetermined interval, and transmission means extending between said first shaft and said cam shaft for driving the latter at slow speed.

3. In combination with a dry cleaning machine adapted to contain a volatile fluid and having a rotatable drum and having a plurality of fluid pressure operated valves for controlling the flow of fluid to and from the machine, an electric motor, means between said motor and the rotatable drum for driving the latter, a timing and control device on the machine and including a plurality of fluid valve assemblies each having a movable valve member, means for conducting fluid under pressure to said valve assemblies, a fluid line connecting each of said valves of the machine with one of said valve assemblies of the timing and control device, a fluid pressure operated electric switch for said motor located remotely from the volatile fluid-containing machine, a relatively long fluid line connecting said remote switch with one of said fluid valve assemblies of the timing and control device, a manually rotatable cam shaft rotatably mounted adjacent said valve assemblies, a cam for each valve assembly on said cam shaft and rotatable therewith, means between each cam and the movable valve member of a valve assembly for actuating the latter, each cam being positioned on the cam shaft to open its valve member at a particular time with respect to the operation of the other valve members and each cam being shaped to maintain its valve member in open position for a predetermined time interval, a speed reduction unit driven by the motor of said machine, and transmission means connecting said speed reduction unit with said cam shaft to drive the latter at slow speed.

References Cited in the file of this patent
UNITED STATES PATENTS

| | | |
|---|---|---|
| 1,365,541 | Rankin | June 11, 1921 |
| 2,030,394 | Pierce | Feb. 11, 1936 |
| 2,100,284 | Kriechbaum | Nov. 23, 1937 |
| 2,128,417 | Kerr | Aug. 30, 1938 |
| 2,307,254 | Bassett | Jan. 5, 1943 |
| 2,421,481 | Collins | June 3, 1947 |
| 2,434,199 | Dyer | Jan. 6, 1948 |
| 2,442,835 | Allen | June 8, 1948 |
| 2,444,645 | Geldhof et al. | July 6, 1948 |
| 2,475,503 | Holthouse et al. | July 5, 1949 |
| 2,574,251 | Dinley | Nov. 6, 1951 |
| 2,697,587 | Conison | Dec. 21, 1954 |
| 2,699,682 | Castner | Jan. 18, 1955 |